United States Patent
Zeller et al.

(10) Patent No.: US 12,095,766 B2
(45) Date of Patent: *Sep. 17, 2024

(54) EFFICIENT GENERATION OF IDENTITY PROVIDER INTEGRATIONS

(71) Applicant: Okta, Inc., San Francisco, CA (US)

(72) Inventors: Daniel Zeller, Truckee, CA (US); Lars Kristian Johansen, San Francisco, CA (US); Venkat Ramanan Viswanathan, Fremont, CA (US); Yu Liu, San Mateo, CA (US); Shantanu Sardal, Jersey City, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/458,970

(22) Filed: Aug. 30, 2023

(65) Prior Publication Data

US 2023/0412598 A1 Dec. 21, 2023

Related U.S. Application Data

(63) Continuation of application No. 17/866,398, filed on Jul. 15, 2022, now Pat. No. 11,785,011, which is a
(Continued)

(51) Int. Cl.
*G06F 21/00* (2013.01)
*H04L 9/40* (2022.01)
*H04L 41/0806* (2022.01)

(52) U.S. Cl.
CPC ...... *H04L 63/0884* (2013.01); *H04L 41/0806* (2013.01); *H04L 63/102* (2013.01); *H04L 63/105* (2013.01)

(58) Field of Classification Search
CPC ............. H04L 63/0884; H04L 41/0806; H04L 63/102; H04L 63/105
See application file for complete search history.

(56) References Cited

U.S. PATENT DOCUMENTS 9,043,886 B2 * 5/2015 Srinivasan .......... H04L 63/0815
726/9
9,137,228 B1 * 9/2015 Newstadt ................ H04L 63/08
(Continued)

FOREIGN PATENT DOCUMENTS

EP        2761522 B1    6/2016
WO    WO-2015171517 A1    11/2015
(Continued)

OTHER PUBLICATIONS

PCT International Search Report and Written Opinion, PCT Application No. PCT/US2021/058220, Nov. 5, 2021, 8 pages.

*Primary Examiner* — Kendall Dolly
(74) *Attorney, Agent, or Firm* — Holland & Hart LLP

(57) ABSTRACT

An authentication system facilitates efficient generation of authentication integrations with third-party identity providers for client systems. The authentication system provides one or more interfaces configured to receive requests to make authentication integrations available for a third-party identity provider. The requests to make authentication integrations available include integration information for the relevant identity provider. Based on the request to make authentication integrations available, the authentication system generates an identity provider profile for the identity provider that can be used to generate authentication integrations with the identity provider for one or more client systems. Once the identity provider profile is generated, the authentication system uses the identity provider profile to generate authentication integrations for one or more client systems that request authentication through the third-party identity provider. In doing so, the authentication system provides an efficient process for providing authentication integrations with identity providers requested by client systems.

20 Claims, 7 Drawing Sheets

Related U.S. Application Data continuation of application No. 17/092,205, filed on Nov. 6, 2020, now Pat. No. 11,431,710.

(56) References Cited

U.S. PATENT DOCUMENTS

| | | | |
|---|---|---|---|
| 10,678,906 B1 | 6/2020 | Loladia et al. | |
| 10,992,474 B2* | 4/2021 | Sharma | H04L 63/0876 |
| 11,336,634 B2* | 5/2022 | Khalil | H04L 9/3263 |
| 11,431,710 B2 | 8/2022 | Zeller et al. | |
| 2008/0021997 A1* | 1/2008 | Hinton | H04L 63/0815 709/225 |
| 2014/0310792 A1* | 10/2014 | Hyland | H04L 63/0815 726/8 |
| 2017/0026374 A1 | 1/2017 | Oberheide et al. | |
| 2017/0251025 A1* | 8/2017 | Varley | H04L 63/0823 |
| 2019/0075115 A1* | 3/2019 | Anderson | H04L 63/06 |
| 2019/0327242 A1 | 10/2019 | Anderson et al. | |
| 2021/0176638 A1* | 6/2021 | Heldt-Sheller | H04W 12/06 |
| 2022/0060469 A1* | 2/2022 | Yee | H04L 63/102 |
| 2022/0086134 A1* | 3/2022 | Xie | H04L 67/02 |
| 2022/0124098 A1* | 4/2022 | Shiralkar | H04L 63/20 |
| 2022/0353262 A1 | 11/2022 | Zeller et al. | |

FOREIGN PATENT DOCUMENTS

| | | |
|---|---|---|
| WO | WO-2019036337 A1 | 2/2019 |
| WO | WO-2019157333 A1 | 8/2019 |

* cited by examiner

300

| | Identity Provider Profile Metadata |
|---|---|

Enter Identity Provider Metadata

| Name | identity_provider |
|---|---|
| Logo URL | img/logos/identity_provider |

| Authorize URL | https://www.identity_provider.com/ap/ba |
|---|---|

Parameters

| Scope | profile profile:user_id postal_code |
|---|---|

Additional Paramaters

| Parameter Name | Property Name | ⊕ |
|---|---|---|

| Token Endpoint URL | https://www.api.identity_provider.com/auth/token |
|---|---|

Additional Parameter

| Parameter Name | Property Name | ⊕ |
|---|---|---|

| Login | appuser.login |
|---|---|
| Email | appuser.email |
| User Name | appuser.userName |

SUBMIT IDENTITY PROVIDER REQUEST

Add Identity Provider Integration

General Settings

| | |
|---:|:---|
| Application Label | identity_provider authentication integration |
| Client ID | client.1234 |
| Client Secret | xd673431 |
| User Match Type | Username |
| JIT Policy | Automatic |
| Account Link Policy | Automatic |
| Username Template | idpuser.email |
| Default Groups | customers |
| AutoLink Group Restriction | customers |
| Application Visibility | ☐ Do not display application icon to users |
| | ☐ Do not display application icon in Mobile app |

Cancel          Done

FIG. 4

EFFICIENT GENERATION OF IDENTITY PROVIDER INTEGRATIONS

RELATED APPLICATIONS

This application is a continuation of and claims priority to U.S. patent application Ser. No. 17/866,398, filed Jul. 15, 2022, which is a continuation of U.S. patent application Ser. No. 17/092,205, filed on Nov. 6, 2020, now U.S. Pat. No. 11,431,710, each of which is incorporated herein by reference in its entirety.

FIELD OF ART

The present invention generally relates to the field of software applications, and more specifically, to generation of authentication integrations for a new identity provider.

BACKGROUND

Authentication systems provide authentication services for client systems, such as enterprise network environments, e.g., so that users of the client systems can be safely granted access to system resources. Authentication systems may interface with other external authentication systems, such as third-party identity providers (e.g., Facebook, Google, Salesforce, etc.), in order to enable users of client systems to authenticate through the external authentication systems that those users may already use. For instance, an authentication system may maintain an authentication integration with a third-party identity provider for a client system that enables users of the client system to authenticate through the third-party identity provider using the authentication integration.

However, development of authentication integrations for each third-party identity provider and client system can be an inefficient and time-consuming process. For example, each new authentication integration may require a developer associated with the authentication system to write unique software for each authentication integration. The inefficient and time-consuming nature of this process leads to slow onboarding of new identity providers for the authentication system and repetitive software development. As such, improved techniques for providing authentication integrations for new third-party claims providers to client systems are needed.

SUMMARY

An authentication system facilitates efficient generation of authentication integrations with third-party identity providers for client systems. The authentication system enables client systems to authenticate through the authentication system using authentication integrations with one or more third-party identity providers (e.g., Facebook, Google, Salesforce, etc.) which are associated with an identity provider profile. The authentication system provides one or more interfaces configured to receive requests to make authentication integrations available for a third-party identity provider by generating an identity provider profile for the third-party identity provider. The requests to make authentication integrations available include integration information for the relevant identity provider. Based on the request to make authentication integrations available, the authentication system generates an identity provider profile the identity provider (e.g., data, software modules, etc.) that can be used to generate authentication integrations with the identity provider for one or more client systems. Once the identity provider profile is generated, the authentication system uses the identity provider profile to generate authentication integrations for one or more client systems that request authentication through the third-party identity provider. In doing so, the authentication system provides an efficient process for providing authentication integrations with identity providers requested by client systems.

In some embodiments, the authentication system receives a request to provide authentication via the third-party identity provider through authentication integrations with the third-party identity provider. Using identity provider integration information for the identity provider, the authentication system generates an identity provider profile for the third-party identity provider. At some time after generating the identity provider profile, the authentication system receives a request to generate an authentication integration with the third-party identity provider for the authentication client system. Based on the request to generate the authentication integration, the authentication system generates the authentication integration using the identity provider profile, where the authentication integration is configured to enable the authentication system to perform authentication for access requests provided by users of the client system using the third-party identity provider.

BRIEF DESCRIPTION OF DRAWINGS

FIG. 3 illustrates an identity provider profile user interface, according to one embodiment.

FIG. 4 illustrates an authentication integration user interface, according to one embodiment.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
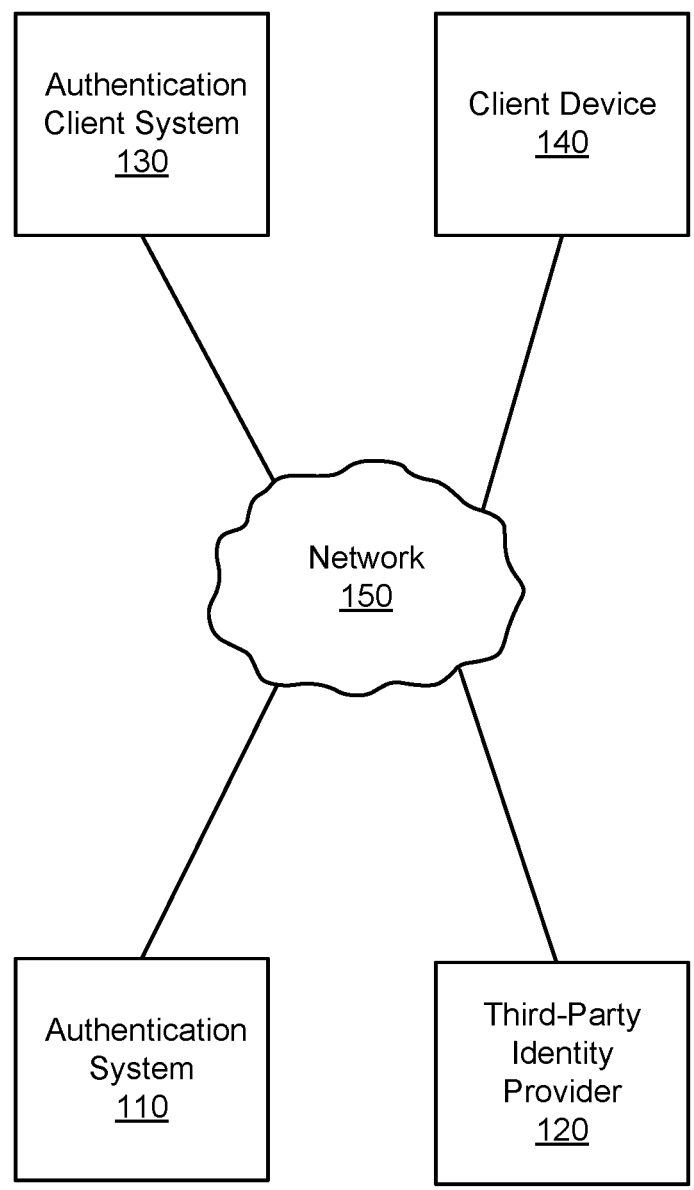
FIG. 1 is a block diagram illustrating a computing environment for generating new authentication integrations for identity providers, according to one embodiment.

FIG. 1 is a block diagram illustrating one embodiment of a computing environment 100 for generating new authentication integrations for identity providers. In the embodiment shown, the computing environment 100 includes an authentication system 110, a third-party identity provider 120, a authentication client system 130, a client device 140, and a network 150. In some embodiments, a user of the client device 140 is a member of an organization (e.g., an employee of a corporation) associated with the authentication client system 130 that contracts with the authentication system 110 to have the authentication system handle authentication on behalf of the members of the organization to access services of the authentication client system 130, which can include internal services of the organization (e.g., an enterprise network or suite of applications) or third-party services used by the organization. Example third-party services include SALESFORCE, MICROSOFT OFFICE 365, SLACK, DOCUSIGN, ZOOM, or the like. In different embodiments, the computing environment 100 and its components may include different or additional elements than those illustrated in FIGS. 1-2. Furthermore, the functionality may be distributed among the elements in a different manner than described. The components of FIG. 1 are now described in more detail.

The authentication system 110 authenticates client devices (e.g., the client device 140) for access to services of the authentication client system 130. For instance, the authentication system 110 may be an authentication platform providing various authentication services to the authentication client system 130, such as single sign-on capabilities, multi-factor authentication (MFA), identity proofing, application programming interface access management, or other authentication services. In embodiments, the authentication system 110 enables the authentication client system 130 to configure authentication via the authentication system 110 for the authentication client system 130. The authentication system 110 enables the authentication client system 130 to use one or more third-party identity providers with existing identity provider profiles managed by the authentication system 110 for generating an authentication integration between the authentication client system 130 and the selected identity provider. As used herein, an "identity provider profile" for a third-party identity provider is a set of configurable data (i.e., "identity provider integration information") corresponding to a third-party identity provider that can be used by the authentication system 110 to generate an authentication integration with the third-party identity provider for individual client systems. After the authentication system 110 generates an authentication integration with a third-party identity provider for a client authentication system, the authentication system 110 can provide authentication via the third-party identity provider for requests for services received from user client devices associated with the authentication client system (e.g., the client device 140).

As used herein, "identity provider integration information" is data usable for generating an authentication integration with the relevant third-party identity provider. For instance, the identity provider integration information for an identity provider can include characteristics (e.g., a logo, communication protocol, or URL), features (e.g., authentication request parameters or available authentication algorithms), or authentication response format (e.g., identity claim type) of the third-party identity provider. Example identity provider integration information is described in greater detail below with reference to the third-party identity provider 120. As used herein, an "authentication integration" is a particular configuration of data or software processes/routines (e.g., identity provider integration information) that enables authentication for users of an individual authentication client system (e.g., the authentication client system 130) by the authentication system 110 using a relevant third-party identity provider. For example, an authentication integration may specify a set of features among the available features of a third-party identity provider to use for authentication (e.g., a particular authentication algorithm), which authentication response format of the third-party identity provider to use, or how the authentication response from the third-party identity provider should be processed by the authentication system 110. In some cases, an authentication integration may enable the authentication system 110 to authenticate users of the authentication client system 130 within the same domain (e.g., as a "first-party connection").

In embodiments, the authentication system 110 uses a shared set of software modules (e.g., a shared software framework) for multiple authentication integrations (e.g., authentication integrations associated with multiple client systems and third-party identity providers) by applying information associated with the authentication integrations to the set of shared software modules, thus avoiding redundant software development. Authentication integrations use different authentication communication protocols depending on the particular third-party identity provider, such as Security Assertion Markup Language (SAML), OAuth, OpenID Connect, or any other appropriate security communication protocols.

The authentication system 110 receives requests (e.g., from client systems) to make authentication integrations available to client systems for new third-party identity providers (i.e., third-party identity providers for which the authentication system 110 does not currently provide authentication integrations). The requests to make authentication integrations available include identity provider integration information for generating an identity provider profile for the relevant third-party identity provider. In response, the authentication system 110 generates an identity provider profile for the new third-party identity provider using the identity provider integration information. Once generated, the authentication system 110 can use the identity provider profile for a third-party identity provider 120 to generate authentication integrations with the third-party identity provider for individual client systems (e.g., the authentication client system 130). For instance, the authentication client system 130 can interact with the authentication system 110 to configure authentication of users of the authentication client system 130 to use an authentication integration with the third-party identity provider 120 generated using an identity provider profile of the third-party identity provider 120. Generating identity provider profiles for new third-party identity providers and using them to generate authentication integrations are described in greater detail below with reference to FIGS. 2-5.

The third-party identity provider 120 is a third-party system that creates and maintains identity information for users of the authentication client system 130. For instance, the third-party identity provider 120 can be a software application or service with an established user-base, such as Facebook™, Google™, or Salesforce™. In embodiments, the third-party identity provider 120 communicates with the authentication system 110 via an authentication integration in order to authenticate users of the authentication client system 130 (e.g., a user of the client device 140). As an example, a user of the authentication client system 130 that has provided identity information to the third-party identity provider 120 may request access to services of the authentication client system 130 (e.g., to log-in) through the third-party identity provider 120. In this case, the authentication system 110 may request authentication of the user by the third-party identity provider 120 through an authentication integration with the third-party identity provider 120 for the authentication client system 130 based on information in the access request. The third-party identity provider 120 processes the information in the access request to verify the identity of the user and provides an authentication response to the authentication system 110 which includes results of the verification (e.g., whether or not the user was successfully authenticated).

The third-party identity provider 120 is associated with identity provider integration information that can be used by the authentication system 110 to generate an authentication integration with the third-party identity provider 120. As described above with reference to the authentication system 110, identity provider integration information for the third-party identity provider 120 can include features, characteristics, authentication response formats, or other relevant information for generating integrations with the third-party identity provide 120. For example, the identity provider integration information may include a name of the third-party identity provider 120, a type of network or communication protocol used by the third-party identity provider 120, one or more available authentication algorithms or processes of the third-party identity provider 120, metadata for the type of network protocol used by the third-party identity provider 120, metadata indicating how to process authentication responses received from the third-party identity provider 120, or information describing user interface elements for display on a user device (e.g., the client device 140) for receiving access requests for authentication by the third-party identity provider 120. Identity provider integration information for the third-party identity provider 120 can be used by the authentication system 110 to generate an identity provider profile for the third-party identity provider 120. Furthermore, the identity provider integration information for the third-party identity provider 120 can be provided through the identity provider profile interface (e.g., submitted by an administrator of the identity provider 120 or the authentication client system 130).

The authentication client system 130 is a client of the authentication system 110 that uses the authentication system 110 to authenticate users of the authentication client system 130. The authentication client system 130 provides services to users (e.g., via the client device 140) that are successfully authenticated by the authentication system 110. As described above with reference to the system environment 100, in some embodiments the authentication client system 130 provides an authenticated user with access to internal services of an organization of which the user is a member and which owns controls client system. In the same or different embodiments, the authentication client system 130 provides an authenticated user with access to services of one or more third-party service providers. The client device 140 communicates with the authentication system 110 to authenticate users for access to services. In embodiments, the authentication client system 130 receives authentication responses from the authentication system 110 including information indicating whether or not a user was successfully authenticated. Based on the received authentication responses, the authentication client system 130 determines whether or not to provide services to the user. In some embodiments, the authentication system 110 is a component of the authentication client system 130.

The client device 140 is a computing device operated by a user associated with the authentication client system 130 (e.g., an employee of an organization that runs the authentication client system 130). The client device 140 can be various computing devices, such as a desktop computer, a laptop computer, a mobile device (e.g., a mobile phone, a tablet, etc.), or any other suitable computing device. In embodiments, the client device 140 requests authentication by the authentication system 110 for access to services of the authentication client system 130 (i.e., access requests), such as services of third-party service providers associated with the authentication client system 130. For example, a user associated with the client device 140 may create a profile at the authentication system 110 by providing login credentials (e.g., a username and password), other demographic information, or device signals for the client device 140. In various embodiments, the client device 140 may access services of the authentication client system 130 via a mobile application, a web application, a browser (e.g., a web page), or any other client-side interface of the authentication client system 130 or the authentication system 110. Additionally, or alternatively, the client device 140 can submit requests to the authentication system 110 to make authentication integrations with new third-party identity providers 120 available. The client device 140 may further communicate with the authentication system 110 via software integrated with a software development kit (SDK) of the authentication client system 130. In this case, the client device 140 may provide access requests to the authentication client system 130 or the authentication system 110 using software tools provided by the SDK. The SDK may be implemented using various programming languages (e.g., Java, C++, Python, etc.).

The network 150 connects the authentication system 110, the third-party identity provider 120, the authentication client system 130, and the client device 140. The network 150 may be any suitable communications network for data transmission. In an embodiment such as that illustrated in FIG. 1, the network 150 uses standard communications technologies or protocols and can include the internet. In another embodiment, the entities use custom or dedicated data communications technologies.

Figure 2:
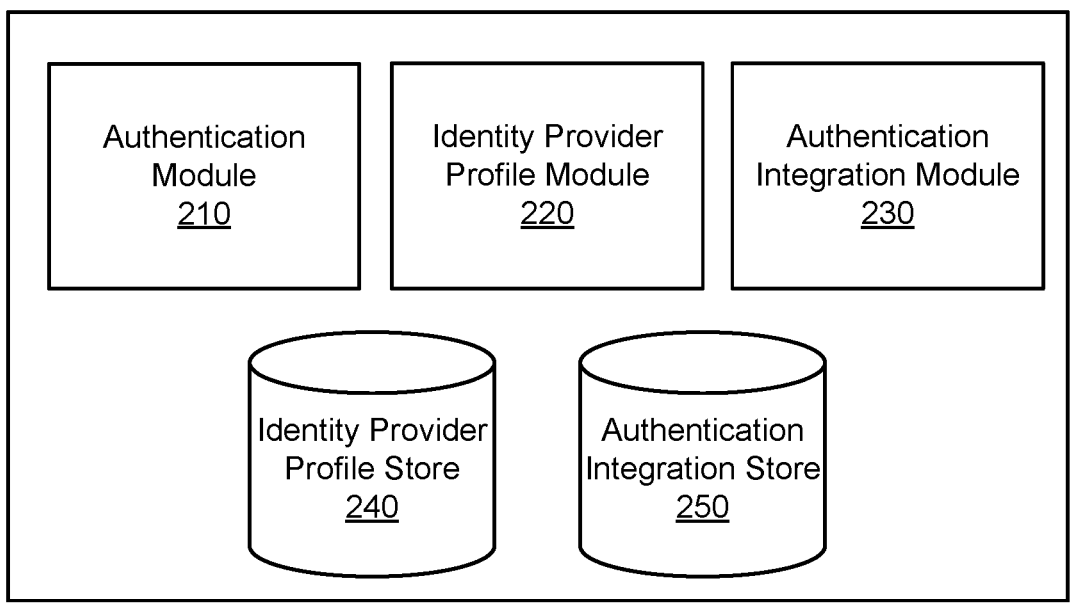
FIG. 2 is a block diagram illustrating one embodiment of an authentication system, according to one embodiment.

FIG. 2 is a block diagram illustrating one embodiment of an authentication system 110. In the embodiment shown, the authentication system 110 includes an authentication module 210 that authenticates users of the authentication client system 130, an identity provider profile module 220 that manages identity provider profiles for third-party identity providers, an authentication integration module 230 that generates authentication integrations with identity providers using respective identity provider profiles, an identity provider profile store 240 that stores identity provider profiles, and an authentication integration store 250 that stores information related to authentication integrations with third-party identity provider. The components of FIG. 2 are now described in more detail.

The authentication module 210 authenticates users for access to services of the authentication client system 130. In embodiments, the authentication module 210 receives an access request from client devices associated with a user of the authentication client system 130 (e.g., the client device 140) and uses information in the access request to authenticate the user. If an access request is intended for authentication by a third-party identity provider (e.g., the third-party identity provider 120) corresponding to an existing authentication integration for the authentication client system 130 (e.g., stored in the authentication integration store 250), the authentication module 210 communicates with the third-party identity provider using the existing authentication integration in order to authenticate the user. For instance, the authentication module 210 may forward information in the access request to the third-party identity provider 120 using the authentication integration and receive an authentication response from the third-party identity provider 120 indicating whether the user was or was not successfully authenticated. The authentication module 210 may further use the authentication integration in order to format the information in the access request provided to the third-party identity provider 120 or to process the authentication response received from the third-party identity provider 120.

The identity provider profile module 220 manages identity provider profiles for third-party identity providers (e.g., the third-party identity provider 120). In embodiments, the identity provider profile module 220 provides an identity provider profile interface to client systems (e.g., the authentication client system 130), which may be a user interface, an application programming interface (API), or any other suitable communication interface. Through the identity provider profile interface, identity provider profile module 220 receives requests to make authentication integrations available to client systems for new third-party identity providers (i.e., "identity provider requests"). For instance, an administrator of the authentication client system 130 may access the identity provider profile interface and submit an identity provider request to the identity provider profile module 220. In particular, an identity provider request includes identity provider integration information for the relevant identity provider that can be used by the authentication system 110 to generate an authentication integration with the identity provider for a client system. An embodiment of an identity provider profile interface is discussed in greater detail below with reference to FIG. 3. The identity provider profile module 220 further processes identity provider requests to determine whether to make authentication integrations available for the relevant identity provider. For example, the identity provider profile module 220 may provide the identity provider request to an administrator of the authentication system 110 for review. If the identity provider request is approved, the identity provider profile module 220 generates an identity provider profile using the identity provider integration information for the third-party identity provider included in the request and stores the identity provider profile in the identity provider profile store 240.

The authentication integration module 230 generates authentication integrations using identity provider profiles for client systems (e.g., the authentication client system 130). In embodiments, the authentication integration module 230 provides an authentication integration interface to client systems, which may be a user interface, an API, or any other suitable communication interface. Through the authentication integration interface, the authentication integration module 230 receives requests to generate an authentication integration with a third-party identity provider for a client system (i.e., authentication integration requests"), where the third-party identity provider is associated with an existing identity provider profile (e.g., stored in the identity provider profile store 240). The authentication integration requests describe a configuration of information included in the identity provider profile of the third-party identity provider, such as a selection of one or more communications protocol, authentication algorithms, or authentication response formats associated with the third-party identity provider. The authentication integration module 230 may provide the authentication integration interface as a user interface displaying a list of available third-party identity providers. In this case, the user interface may be configured to receive user input indicating a selection of one of the available third-party identity providers in order to submit an authentication integration request. Responsive to receiving an authentication integration request for a selected third-party identity provider for a client system, the authentication integration module 230 generates the authentication integration using an identity provider profile for the third-party identity provider (e.g. stored in the identity provider profile store 240). After an authentication integration for a client system is generated by the authentication integration module 230, the authentication system 110 provides authentication for users of the client system using the generated authentication integration (e.g., by the authentication module 210).

As described above with reference to the authentication system 110, authentication integrations generated by the authentication integration module 220 for multiple combinations of client systems and third-party identity providers use a shared set of software modules (e.g., software classes or routines). As such, a component of the authentication system 110 (e.g., the authentication module 210) can apply information for a specific authentication integration (e.g., identity provider integration information) to the shared set of software modules or routines without generating additional software or data. For example, the authentication module 210 may retrieve information associated with an authentication integration between the authentication client system 130 and the third-party identity provider 120 (e.g., from the authentication integration store 250) after receiving an access request associated with a user of the authentication client system 130 and intended for authentication by the third-party identity provider 120. The authentication module 210 may then apply the retrieved information to the set of shared software modules in order to request authentication by the third-party identity provider 120 or process an authentication response from the third-party identity provider 120.

In some embodiments, the authentication integration module 230 receives or otherwise obtains information to customize an authentication integration for a client system (i.e., client integration information), such as in included in the request to generate the authentication integration. For example, the authentication integration module 230 may receive client integration information for the authentication client system 130 through the authentication integration interface. The client integration information can include various custom authentication integration parameters for an authentication client system, such as a secret key of the authentication client system 130 to use for communications with the third-party identity provider, a just-in-time (JIT) access policy for the client system, a username template for users of the client system attempting to authenticate using the authentication integration, or any other information used to generate an authentication integration for the client system. In such embodiments, the authentication integration module 230 uses client integration information to generate an authentication integration with the relevant identity provider for the client system. An embodiment of an authentication integration interface is discussed in greater detail below with reference to FIG. 4.

Exemplary User Interfaces

FIG. 3 illustrates an embodiment of an identity provider profile user interface 300. The user interface 300 is provided for display by the authentication system 110 (e.g., by the identity provider profile module 220) to a client device associated the authentication client system 130 (e.g., a computing device of an administrator of the authentication client system 130) for receiving requests to generate identity provider profiles. In the embodiment shown, the user interface 300 includes a series of fields configured to receive identity provider integration information for a new third-party identity provider through user input. In particular, the user interface 300 includes a set of non-customizable fields (e.g., a "name" and "Logo URL" field) and a set of customizable fields (e.g., the "authorize URL" and "Token Endpoint URL" fields) configured to receive appropriate data values. As depicted, the non-customizable fields and the customizable fields are populated with values describing identity provider integration information for a third-party identity provider (e.g., the third-party identity provider 120), which are provided for the purposes of illustration only and can include other appropriate values for any third-party identity provider. The non-customizable fields are a set of generic fields corresponding to universal information for third-party identity providers (e.g., the name of an identity provider). In contrast, the customizable fields are fields that can be arbitrarily associated with additional parameters (e.g., using the "+" button depicted in FIG. 3). As depicted, the customizable fields include a primary field (e.g., the "Authorize URL" field) corresponding to a generic identity provider parameter and one or more configurable parameters associated with the primary field (e.g., the "scope" field for the "Authorize URL" field) corresponding to parameters that have varying properties and parameters between different identity providers. The customizable fields include an interface element configured to add any number of parameter fields for each configurable field based on the characteristics of the relevant identity provider (i.e., the "+" button).

At the bottom of the user interface 300 are non-customizable fields representing formats of values included in an authentication response from the relevant third-party identity provider (e.g., the identity claims provided by the third-party identity provider). In particular, as depicted in FIG. 3 the values for the "login," "email" and "user name" fields indicate that the third-party identity provider provides corresponding values in an authentication response using the respective formats "appuser.login," "appuser.email," and "appuser.userName" (e.g., using a format with the form [user identifier].[identity claim value]). The particular non-customizable and customizable fields depicted in FIG. 3 are provided for the purposes of illustration only, and the user interface 300 may include additional or different fields in the same or different embodiments.

FIG. 4 illustrates an embodiment of an authentication integration user interface 400. Similar to the user interface 300, the user interface 400 is provided for display by the authentication system 110 (e.g., by the authentication integration module 230) to a client device associated with the authentication client system 130 (e.g., a computing device of an administrator of the authentication client system 130). For instance, an administrator of the client system may interact with one or more user interfaces provided for display by the authentication system 110 to select a third-party identity provider with an existing identity provider profile (e.g., stored in the identity provider profile store 240). As an example, the authentication system 110 may provide a user interface displaying a selectable list of third-party identity providers with existing identity provider profiles managed by the authentication system 110.

In the embodiment shown, the user interface 400 includes a series of fields configured to receive client integration information for a client system (e.g., the authentication client system 130) usable by the authentication system 110 to generate an authentication integration with a third-party identity provider (e.g., the third-party identity provider 120) for the client system. The authentication system 110 may adjust the particular fields included in the user interface 400 to conform to the third-party identity provider associated with the user interface 400. For example, if the identity provider profile for the third-party identity provider indicates that the third-party identity provider uses OpenID Connect (OIDC) for a communication protocol, the authentication system 110 includes the "Client ID" and "Client Secret" fields in the user interface 400 which are requisite parameters for OIDC, as is the case in FIG. 4. The user interface 400 may include other fields for receiving other types of client integration information depending on the particular third-party identity provider selected for generating an integration.

As depicted in FIG. 4, the fields of the user interface 400 are populated with values associated with the authentication client system 130, which are provided for the purposes of illustration only and can include appropriate values for any authentication client system. The fields of the user interface 400 include fields for configuring how the integration is provided to users of the client authentication system 130. In particular, the "Application Label" field and "Application Visibility" toggle options define a name for an application representing the integration (e.g., a desktop or mobile application) and visibility of a virtual icon for the application, respectively. Some or all of the fields of the user interface 400 may be optional (e.g., the "default groups" or "AutoLink Group Restriction" fields). In this case, if a request to generate an authentication integration is received that does not include values for some or all of the client integration information fields, the authentication system 110 may automatically retrieve values or select default values to generate the authentication integration for the client system. The user interface 400 further includes fields for configuring how the third-party identity provider authenticates an access request associated with the authentication client system 130. For instance, the "User Match Type" field indicates what value should be used to confirm an identity of a user, such as the username in the case of FIG. 4.

Additionally, the user interface 400 includes fields for specifying how the integration should handle authentication for users of the authentication client system 130 associated with user accounts at the third-party identity provider 120 (i.e., identity provider accounts) and user accounts at the authentication system 110 (i.e., authentication accounts). These various types of users are referred to as "groups" in FIG. 4 (e.g., by the "Default Groups" and "AutoLink Group Restriction" fields). In particular, the "just-in-time (JIT) policy" field can be used to configure a JIT policy indicating whether or not the identity provider account should be used to update a corresponding authentication account. For instance, the "automatic" option selected in FIG. 4 indicates that the authentication system 110 should use the identity provider account for ground truth information to update a corresponding authentication account. Similarly, the "Account Link Policy" field can be used to configure whether the authentication system 110 links the authentication account and the identity provider account for a given user of the authentication client system 130. For example, the Account Link Policy field can be configured to indicate whether the authentication system 110 creates new authentication accounts based on an authentication response from the identity provider 120 (e.g., the "automatic" option selected in FIG. 4) or processes the authentication response without creating a new authentication account. Furthermore, the "Default Groups" field specifies that "customer" users of the authentication client system 130 should be able to use the integration for authenticating access requests. Similarly, the "AutoLink Group Restriction" field specifies types of users to which an account link policy (e.g., as specified in the Account Link Policy" field) should not be applied by the authentication system 110. Relatedly, the "User Match Type" field indicates what value the authentication system 110 should compare between the authentication account and the identity provider account to determine whether the authentication account and the identity provider account should be linked (e.g., a username in the case of FIG. 4). Further, the "Username Template" field receives an expression describing how a value in the authentication response representing a username of a user in an identity provider account is converted to username for a linked authentication account by the authentication system 110.

Processes for Generating Authentication Integrations

Figure 5:
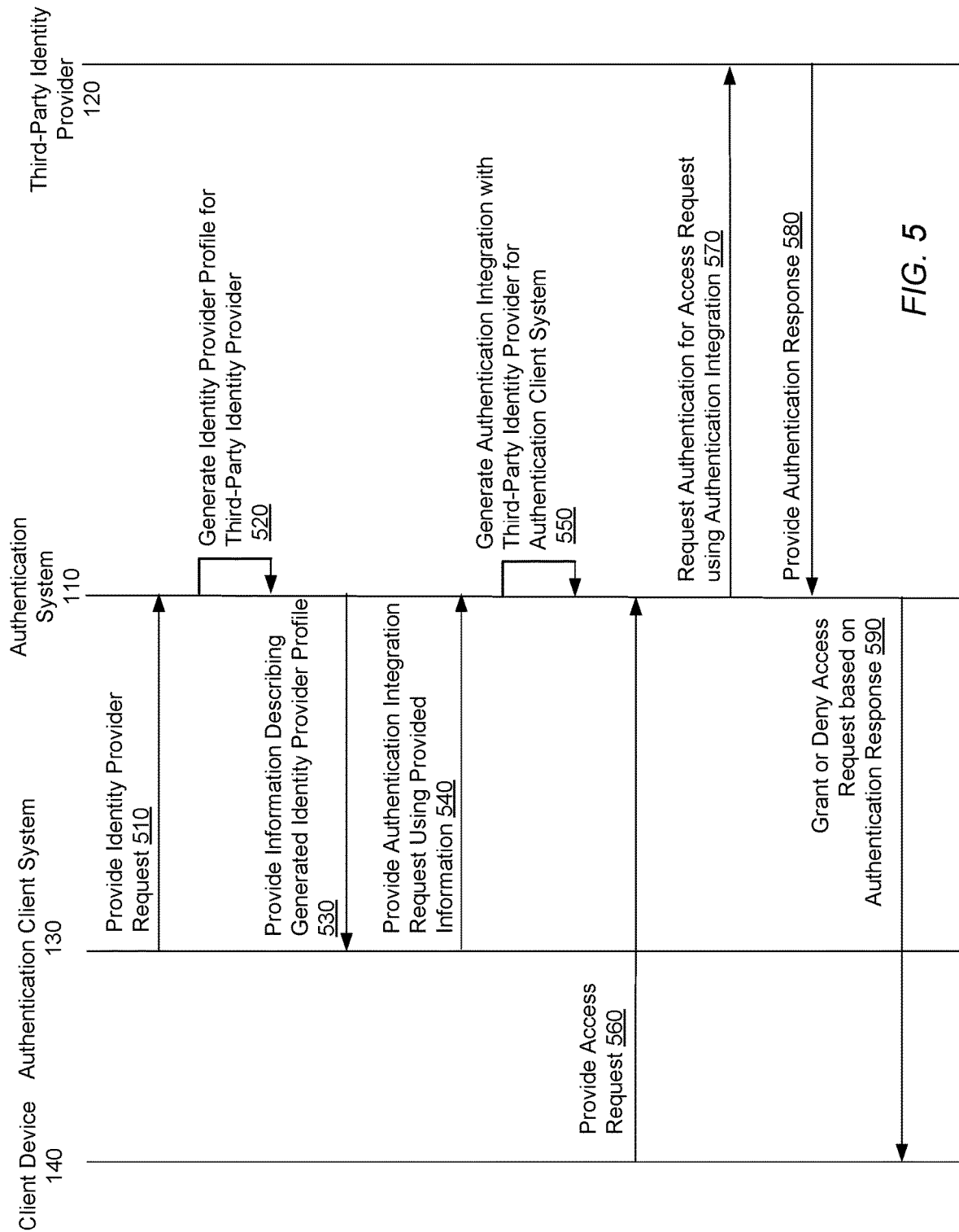
FIG. 5 is a sequence diagram illustrating interactions between an authentication system, a third-party identity provider, an authentication client system, and a client device, according to one embodiment.

FIG. 5 is a sequence diagram illustrating an embodiment of interactions between the authentication system 110, the third-party identity provider 120, the authentication client system 130, and the client device 140.

The sequence of interactions depicted in FIG. 5 begins with the authentication client system 130 providing 510 an identity provider request for the third-party identity provider 120 to the authentication system 110 that includes identity provider integration information for the third-party identity provider 120. For example, an administrator of the authentication client system 130 may provide the identity provider request via an identity provider profile interface provided by the identity provider profile module 220. Using the identity provider integration information, the authentication system 110 generates 520 an identity provider profile for the third-party identity provider 120. After generating the identity provider profile, the authentication system 110 provides 530 information describing the generated identity provider profile 530 to the client system 130, such as in a list of identity provider profiles available for generating authentication integrations. Using the information, the authentication client system 130 provides 540 an authentication integration request for the third-party identity provider 120. For example, an administrator of the authentication client system 130 may provide an authentication integration request via an authentication integration interface provided by the authentication integration module 230. Based on the authentication integration request, the authentication system 110 generates 550 an authentication integration with the third-party identity provider 120 for the authentication client system 130.

At some time after the authentication system 110 generates the authentication integration, the client device 140 provides 560 an access request to the authentication system 110. For example, a user of the client device 140 may provide an access request to the authentication module 210 for accessing services of the authentication client system 130 on the client device 140. The access request may be submitted by the user through an interface provided for display on the client device 140 by the authentication system 110 that is associated with the third-party identity provider 120, such as an interface described in the identity provider profile. Based on the access request, the authentication system requests 570 authentication for the access request by the third-party identity provider 130 using the authentication integration. For example, the authentication module 210 may apply information associated with the authentication integration (e.g., identity provider integration information or client integration information) to a set of shared software modules in order to request authentication for the access request by the third-party identity provider 120. After performing authentication for the access request, the third-party identity provider 120 provides 580 an authentication response to the authentication system 110. Based on the authentication response, the authentication system 110 grants or denies 590 the access request for the client device 140. For instance, the authentication system 110 may provide the user access to services of the authentication client system 130 depending on whether or not the user was successfully authenticated.

Figure 6:
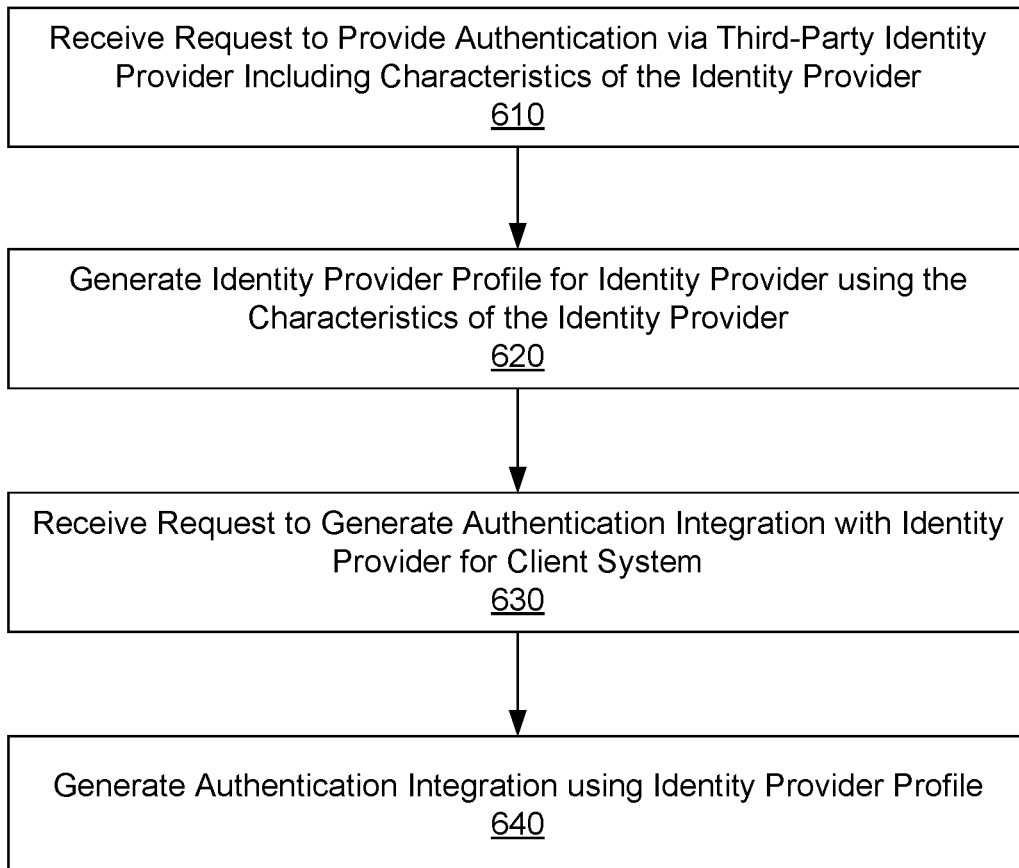
FIG. 6 is a flowchart illustrating a process for generating an authentication integration with a third-party identity provider for a client system, according to one embodiment.

FIG. 6 is a flowchart illustrating a process 600 for generating an authentication integration with the third-party identity provider 120 for the authentication client system 130, according to one embodiment. In the embodiment shown, the steps of FIG. 6 are illustrated from the perspective of authentication system 110 performing the process 600.

In the embodiment shown in FIG. 6, the process 600 begins with authentication system 110 receiving 610 a request to provide authentication via the third-party identity provider 120 through authentication integrations with the third-party identity provider 120. In particular, the request includes identity provider integration information for the third-party identity provider 120 (e.g., metadata or other information describing characteristics or properties of the third-party identity provider 120). As an example, the identity provider profile module 220 may receive an identity provider request submitted by an administrator of the authentication client system 130 for the third-party identity provider 120. Using identity provider integration information for the identity provider, the authentication system 110 generates 620 an identity provider profile for the third-party identity provider 120. For instance, the identity provider profile module 220 may provide the request to an administrator of the authentication system 110 for review and approval or denial. In this case, the identity provider profile module 220 may generate an identity provider profile for the third-party identity provider 120 and store the identity provider profile in the identity provider profile store 240 if the request is approved. At some time after generating the identity provider profile, the authentication system 110 receives 630 a request to generate an authentication integration with the third-party identity provider 120 for the authentication client system 130. For example, an administrator of the authentication client system 130 may submit a request to generate the authentication integration via an authentication integration interface provided by the authentication integration module 230. Based on the request to generate the authentication integration, the authentication system 110 generates 640 the authentication integration using the identity provider profile, where the authentication integration is configured to enable the authentication system to perform authentication for access requests provided by users of the client system using the third-party identity provider. For example, the authentication integration module 230 may generate the authentication integration using an identity provider profile in the identity provider profile store 240.

As such, through the sequence of interactions depicted in FIG. 5, the process 600, or other processes described herein, the authentication system 110 provides an efficient process for generating new authentication integrations with third-party identity providers for client systems. In particular, the authentication system 110 generates authentication integrations differently than human administrators or developers by eliminating redundant and inefficient tasks that increase the complexity and duration of integration development and are mandated by conventional systems. For instance, the authentication system 110 provides interfaces for efficiently receiving integration information for third-party identity providers or client systems, which may include custom parameters for an authentication integration using the received information. Advantageously, any user of the authentication system 110 can provide the integration information for a third-party identity provider, as opposed to dedicated integration developers or administrators, as required by conventional systems. After generating an authentication integration using this identity provider integration information, the authentication system 110 can apply the information to a set of shared software modules in order to perform authentication of relevant access requests. In contrast, conventional systems would require manual research of the identity provider integration information for the third-party identity provider 120 and would further require software developers to develop unique software for an authentication integration with the third-party identity provider 120 for the authentication client system 130. In doing so, conventional systems provide a lengthy, complicated, and resource intensive processes for creating authentication integrations for new third-party identity providers.

In other embodiments than those shown in FIG. 5 or FIG. 6, some or all of the steps may be performed by other entities or components. In addition, some embodiments may perform the steps in parallel, perform the steps in different orders, or perform different steps.

Exemplary Computer Architecture

Figure 7:
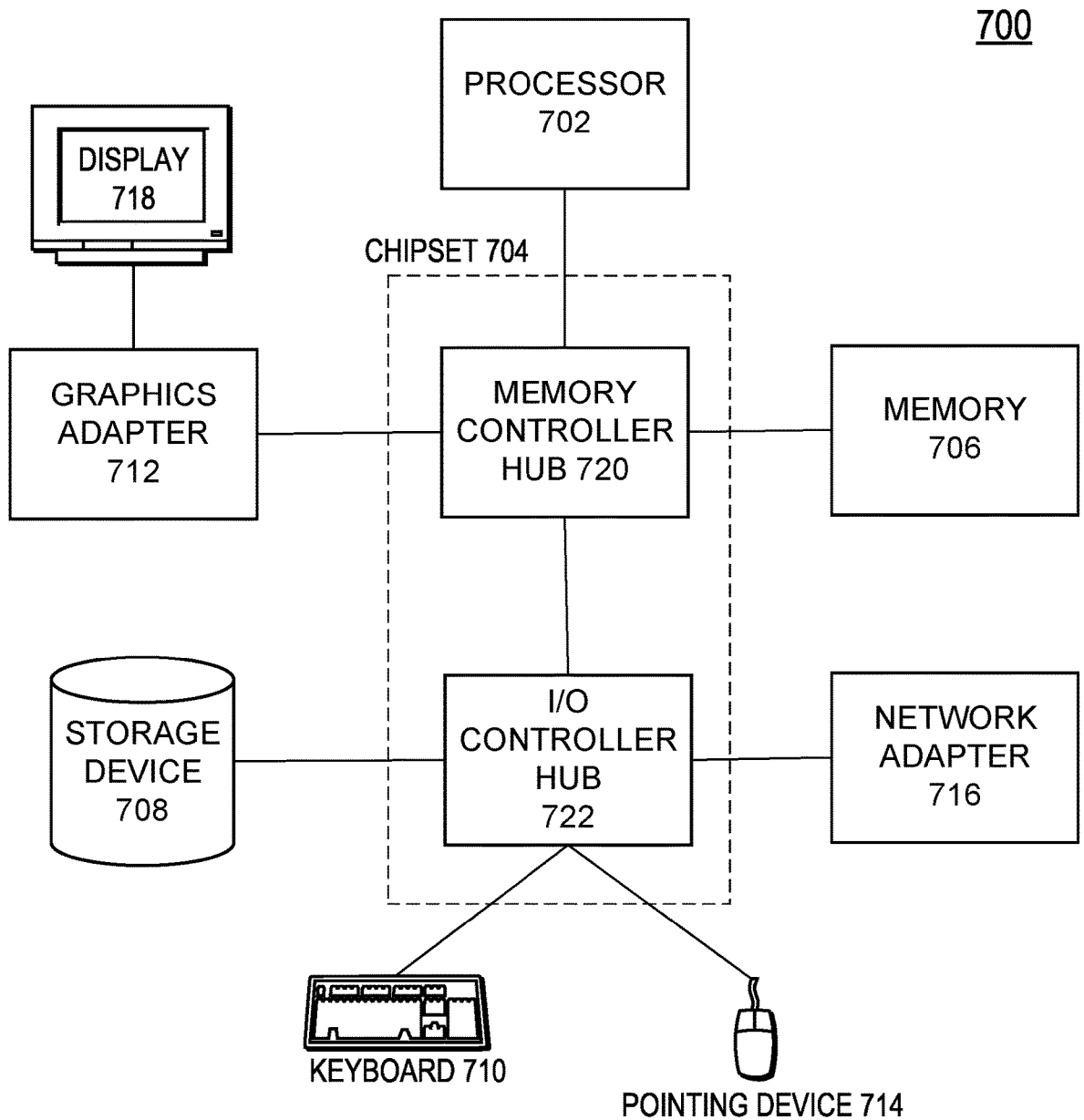
FIG. 7 is a high-level block diagram illustrating physical components of a computer used as part or all of the server, organization, client device of a user, or system providing the third-party application, according to one embodiment.

FIG. 7 is a block diagram illustrating physical components of a computer 700 used as part or all of the authentication system 110, the third-party identity provider 120, the authentication client system 130, or the client device 140 from FIG. 1, in accordance with an embodiment. Illustrated are at least one processor 702 coupled to a chipset 704. Also coupled to the chipset 704 are a memory 706, a storage device 708, a graphics adapter 712, and a network adapter 716. A display 718 is coupled to the graphics adapter 712. In one embodiment, the functionality of the chipset 604 is provided by a memory controller hub 720 and an I/O controller hub 722. In another embodiment, the memory 706 is coupled directly to the processor 702 instead of the chipset 704.

The storage device 708 is any non-transitory computer-readable storage medium, such as a hard drive, compact disk read-only memory (CD-ROM), DVD, or a solid-state memory device. The memory 706 holds instructions and data used by the processor 702. The graphics adapter 712 displays images and other information on the display 718. The network adapter 716 couples the computer 700 to a local or wide area network.

As is known in the art, a computer 700 can have different and/or other components than those shown in FIG. 6. In addition, the computer 700 can lack certain illustrated components. In one embodiment, a computer 700, such as a host or smartphone, may lack a graphics adapter 712, and/or display 718, as well as a keyboard 710 or external pointing device 614. Moreover, the storage device 708 can be local and/or remote from the computer 700 (such as embodied within a storage area network (SAN)).

As is known in the art, the computer 700 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 708, loaded into the memory 706, and executed by the processor 702.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of the above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the element or component is present unless it is obvious that it is meant otherwise.

Where values are described as "approximate" or "substantially" (or their derivatives), such values should be construed as accurate+/−10% unless another meaning is apparent from the context. From example, "approximately ten" should be understood to mean "in a range from nine to eleven."

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method of an authentication system comprising:
receiving, from a client system and based on an indication of a selection of an identity provider profile from a list of available identity provider profiles, a request to generate an authentication integration associated with a third-party identity provider associated with the selected identity provider profile;
generating, using information associated with the selected identity provider profile, the authentication integration associated with the third-party identity provider;
receiving, from a user device via an authentication interface associated with the third-party identity provider, a request for access to the client system;
providing, to a third-party identity provider system associated with the third-party identity provider and using the authentication integration, a request for authentication for the access request;
processing, in response to receiving an authentication response from the third-party identity provider system, the authentication response using the authentication integration associated with the third-party identity provider to determine whether authentication was successful; and
providing, to the user device and based on whether authentication was successful, an access request response formatted using the authentication integration associated with the third-party identity provider.

2. The method of claim 1, wherein the authentication integration associated with the third-party identity provider is configured to enable communication between the third-party identity provider and the authentication system via one of security assertion markup language (SAML), OAuth, or OpenID.

3. The method of claim 1, wherein the access request response indicates whether the access request has been granted or denied.

4. The method of claim 1, wherein providing the request for authentication for the access request comprises:
retrieving authentication integration information associated with the authentication integration associated with the third-party identity provider;
applying the retrieved authentication integration information to a set of shared software modules used for authentication integrations between a plurality of client systems and a plurality of third-party identifiers; and
requesting, from the third-party identity provider system and using the set of shared software modules having the applied authentication integration information, the authentication for the access request.

5. The method of claim 4, wherein the retrieved authentication integration information comprises identity provider integration information for the third-party identity provider or client integration information for with the client system.

6. The method of claim 5, wherein the identity provider integration information for the third-party identity provider includes one or more of: a name of the third-party identity provider, a type of network protocol used by the third-party identity provider, metadata for the type of network protocol used by the third-party identity provider, metadata indicating how to process or format the authentication response, metadata indicating an authentication response format, or information describing user interface elements associated with the authentication interface associated with the third-party identity provider.

7. The method of claim 5, wherein the client integration information for the client system includes one or more of: a secret key to be used for communications by the client system with the third-party identity provider, a just-in-time (JIT) access policy for the client system, or a username template for authentication associated with access requests to the client system.

8. An authentication system comprising:
one or more processors; and
memory storing instructions that, when executed by the one or more processors individually or collectively, cause the authentication system to:
receive, from a client system and based on an indication of a selection of an identity provider profile from a list of available identity provider profiles, a request to generate an authentication integration associated with a third-party identity provider associated with the selected identity provider profile;

generate, using information associated with the selected identity provider profile, the authentication integration associated with the third-party identity provider;

receiving, from a user device via an authentication interface associated with the third-party identity provider, a request for access to the client system;

provide, to a third-party identity provider system associated with the third-party identity provider and using the authentication integration, a request for authentication for the access request;

process, in response to receiving an authentication response from the third-party identity provider system, the authentication response using the authentication integration associated with the third-party identity provider to determine whether authentication was successful; and provide, to the user device and based on whether authentication was successful, an access request response formatted using the authentication integration associated with the third-party identity provider.

9. The authentication system of claim 8, wherein the authentication integration associated with the third-party identity provider is configured to enable communication between the third-party identity provider and the authentication system via one of security assertion markup language (SAML), OAuth, or OpenID.

10. The authentication system of claim 8, wherein the access request response indicates whether the access request has been granted or denied.

11. The authentication system of claim 8, wherein, to provide the request for authentication for the access request, the instructions, when executed by the one or more processors individually or collectively, cause the authentication system to:

retrieve authentication integration information associated with the authentication integration associated with the third-party identity provider;

apply the retrieved authentication integration information to a set of shared software modules used for authentication integrations between a plurality of client systems and a plurality of third-party identifiers; and request, from the third-party identity provider system and using the set of shared software modules having the applied authentication integration information, the authentication for the access request.

12. The authentication system of claim 11, wherein the retrieved authentication integration information comprises identity provider integration information for the third-party identity provider or client integration information for with the client system.

13. The authentication system of claim 12, wherein the identity provider integration information for the third-party identity provider includes one or more of: a name of the third-party identity provider, a type of network protocol used by the third-party identity provider, metadata for the type of network protocol used by the third-party identity provider, metadata indicating how to process or format the authentication response, metadata indicating an authentication response format, or information describing user interface elements associated with the authentication interface associated with the third-party identity provider.

14. The authentication system of claim 12, wherein the client integration information for the client system includes one or more of: a secret key to be used for communications by the client system with the third-party identity provider, a just-in-time (JIT) access policy for the client system, or a username template for authentication associated with access requests to the client system.

15. A non-transitory, computer-readable medium storing instructions that, when executed by one or more processors individually or collectively, cause an authentication system to:

receive, from a client system and based on an indication of a selection of an identity provider profile from a list of available identity provider profiles, a request to generate an authentication integration associated with a third-party identity provider associated with the selected identity provider profile;

generate, using information associated with the selected identity provider profile, the authentication integration associated with the third-party identity provider;

receiving, from a user device via an authentication interface associated with the third-party identity provider, a request for access to the client system;

provide, to a third-party identity provider system associated with the third-party identity provider and using the authentication integration, a request for authentication for the access request;

process, in response to receiving an authentication response from the third-party identity provider system, the authentication response using the authentication integration associated with the third-party identity provider to determine whether authentication was successful; and provide, to the user device and based on whether authentication was successful, an access request response formatted using the authentication integration associated with the third-party identity provider.

16. The non-transitory, computer-readable medium of claim 15, wherein the authentication integration associated with the third-party identity provider is configured to enable communication between the third-party identity provider and the authentication system via one of security assertion markup language (SAML), OAuth, or OpenID.

17. The non-transitory, computer-readable medium of claim 15, wherein the access request response indicates whether the access request has been granted or denied.

18. The non-transitory, computer-readable medium of claim 15, wherein, to provide the request for authentication for the access request, the instructions, when executed by the one or more processors individually or collectively, cause the authentication system to:

retrieve authentication integration information associated with the authentication integration associated with the third-party identity provider;

apply the retrieved authentication integration information to a set of shared software modules used for authentication integrations between a plurality of client systems and a plurality of third-party identifiers; and request, from the third-party identity provider system and using the set of shared software modules having the applied authentication integration information, the authentication for the access request.

19. The non-transitory, computer-readable medium of claim 18, wherein the retrieved authentication integration information comprises identity provider integration information for the third-party identity provider or client integration information for with the client system.

20. The non-transitory, computer-readable medium of claim 19, wherein the identity provider integration information for the third-party identity provider includes one or more of:

a name of the third-party identity provider, a type of network protocol used by the third-party identity provider, metadata for the type of network protocol used by the third-party identity provider, metadata indicating how to process or format the authentication response, metadata indicating an authentication response format, or information describing user interface elements associated with the authentication interface associated with the third-party identity provider, and wherein the client integration information for the client system includes one or more of: a secret key to be used for communications by the client system with the third-party identity provider, a just-in-time (JIT) access policy for the client system, or a username template for authentication associated with access requests to the client system.

* * * * *